U S 0 0 5 8 7 3 2 9 6 A

United States Patent [19]
Shirahata et al.

[11] Patent Number: 5,873,296
[45] Date of Patent: Feb. 23, 1999

[54] BOOSTER APPARATUS OF VACUUM TYPE

[75] Inventors: Kiyoshi Shirahata; Mitsuhiro Endo, both of Yamanashi-ken, Japan

[73] Assignee: Tokico Ltd., Kawasaki, Japan

[21] Appl. No.: 862,879

[22] Filed: May 27, 1997

Related U.S. Application Data

[63] Continuation of Ser. No. 528,153, Sep. 14, 1995, abandoned.

[30] Foreign Application Priority Data

Sep. 19, 1994 [JP] Japan .................................. 6-250013

[51] Int. Cl.$^6$ ...................................................... F15B 9/10
[52] U.S. Cl. .............................................. 91/369.2; 60/554
[58] Field of Search ............................... 91/369.2, 369.3; 92/84; 60/554

[56] References Cited

U.S. PATENT DOCUMENTS

| | | | |
|---|---|---|---|
| 3,132,567 | 5/1964 | Ingres et al. ........................... | 91/369.2 |
| 4,353,287 | 10/1982 | Weiler . | |
| 4,354,423 | 10/1982 | Ohmi et al. ............................ | 91/369.3 |
| 4,409,885 | 10/1983 | Reinartz et al. ................... | 91/369.2 X |
| 4,425,760 | 1/1984 | Furuta ................................ | 91/369.3 X |
| 4,611,526 | 9/1986 | Arino et al. ........................... | 91/369.2 |
| 4,643,075 | 2/1987 | Wagner ................................. | 91/369.2 |
| 4,756,231 | 7/1988 | Kobayashi et al. .................... | 91/369.2 |
| 4,892,027 | 1/1990 | Wagner et al. ........................ | 91/369.2 |
| 5,146,837 | 9/1992 | Inoue ..................................... | 91/369.3 |
| 5,214,995 | 6/1993 | Gautier ............................... | 91/369.1 X |
| 5,261,313 | 11/1993 | Yared ................................. | 91/369.2 X |
| 5,263,398 | 11/1993 | Kobayashi et al. .................... | 91/369.2 |
| 5,367,941 | 11/1994 | Gautier et al. .......................... | 91/369.2 |
| 5,386,760 | 2/1995 | Goto et al. .............................. | 92/84 X |

FOREIGN PATENT DOCUMENTS

| | | |
|---|---|---|
| 1505410 | 11/1969 | Germany . |
| 29 18 910 | 12/1980 | Germany . |
| 54-111061 | 8/1979 | Japan . |
| 56-86853 | 7/1981 | Japan . |
| 59-195460 | 6/1984 | Japan . |
| 5-185926 | 7/1993 | Japan . |
| 2 051 276 | 1/1981 | United Kingdom . |

*Primary Examiner*—F. Daniel Lopez
*Attorney, Agent, or Firm*—Wenderoth, Lind & Ponack, L.L.P.

[57] ABSTRACT

A booster apparatus of a vacuum type for a brake device has a housing including therein a chamber, a diaphragm for dividing the chamber of the housing into a constant pressure chamber and a variable pressure chamber, an input shaft including a distal end, an output shaft including a proximal end, a plunger which is engageable with the distal end of the input shaft for transmitting force from the input shaft to the output shaft, a reaction disk disposed between the plunger and the proximal end of the output shaft for transmitting reaction from the output shaft to the plunger, and a valve body mounted on the diaphragm. The valve body includes a hole for slidably receiving the plunger, a recess for fixedly receiving the reaction disk and the proximal end of the output shaft which recess is larger than the plunger hole in inner diameter, and an intermediate hole portion disposed between the plunger hole and the recess. The intermediate hole portion is smaller than the recess and is larger than the plunger hole in inner diameter.

32 Claims, 6 Drawing Sheets

BOOSTER APPARATUS OF VACUUM TYPE

This application is a continuation of now abandoned application Ser. No. 08/528,153 filed Sep. 14, 1995.

BACKGROUND OF THE INVENTION

1. Field of the Invention

The present invention relates to a booster apparatus of a vacuum type used in a brake device of an automobile.

2. Related Background Art

FIG. 8 shows one example of conventional booster apparatuses of a vacuum type. The booster apparatus includes a housing 1 having therein a constant pressure chamber 4 and a variable pressure chamber 5 which are divided by a diaphragm 3 supported by a power piston 2. Negative pressure generated by an internal combustion engine (not shown) is introduced into the constant pressure chamber 4 through an intake pipe 6. The booster apparatus also includes a generally cylinder-shaped valve body 7 having at the outer side thereof annular grooves 2a and 3a. The inner ends of the power piston 2 and the diaphragm 3 are fixedly fitted into the annular grooves 2a and 3a, respectively.

The valve body 7 includes a large diameter cylinder portion 8 mounted on the power piston 2 and the diaphragm 3 and a small diameter cylinder portion 9. The small diameter cylinder portion 9 is integrally formed with the large diameter cylinder portion 8. The rear end portion of the small diameter cylinder portion 9 extends through the rear of the housing 1 outwardly of the housing. An appropriate portion between the rear of the housing 1 and the small diameter cylinder portion 9 is tightly sealed to prevent the variable pressure chamber 5 from being brought into communication with the atmosphere through between the rear of the housing 1 and the small diameter cylinder portion 9. The interior of the valve body 7 communicates with the atmosphere.

An input shaft 10 connected to a brake pedal (not shown) extends into the small diameter cylinder portion 9. A plunger 11 moving in interlocking relation with the input shaft 10 is provided at the leading end portion of the input shaft 10. The valve body 7 includes therein a plunger supporting slide hole portion 12. The plunger 11 slides along the slide hole portion 12. The valve body also includes at its leading side a recess 13 which has a larger inner diameter than the slide hole portion 12. The recess 13 is adjacent to the slide hole portion 12. The base portion 15 of an output shaft 14 and the whole of an elastic reaction disk 16 are inserted into the recess 13. The diameter of the base portion 15 of the output shaft 14 is substantially identical to (or slightly smaller than) the inner diameter of the recess 13. The diameter of the reaction disk 16 is also substantially identical to (or slightly smaller than) the inner diameter of the recess 13.

The valve body 7 includes an air passage 17 for communication of the variable pressure chamber 5 with the inside of the valve body 7 and a negative pressure passage 18 for communication of the constant pressure chamber 4 with the inside of the valve body 7. Provided on the inside of the valve body 7 is a valve member 21. An air valve 19 includes portions of the valve member 21 and the plunger 11. A vacuum valve 20 includes portions of the valve member 21 and the valve body 7. The valve member 21 is biased toward the output shaft 14 by a valve spring 22 provided between the valve member 21 and the input shaft 10. The air valve 19 and the vacuum valve 20 are opened and closed in response to the movement of the input shaft 10, the plunger 11 and the valve body 7 relative to each other. A spring 40 is provided between the small portion 9 and the input shaft 10. A diaphragm return spring 41 is provided in the housing 1 for biasing the valve body 7 toward the input shaft 10.

In the initial state as shown in FIG. 8 (during which the engine is in operation and the brake pedal is not in operation), the constant pressure chamber 4 is the same in pressure (negative pressure) as the variable pressure chamber 5, and both the air valve 19 and the vacuum valve 20 are in a closed position. The application of at least a force of $F_1$ (see FIG. 9) pushing the input shaft 10 then moves the plunger 11 forwardly of the valve member 21, thereby opening the air valve 19 with the vacuum valve 20 being in the closed position. The opening of the air valve 19 allows the air to flow into the variable pressure chamber 5 through the air passage 17, thereby causing a pressure difference between the constant pressure chamber 4 and the variable pressure chamber 5. Thus, this provides the output shaft 14, through the valve body 7 and the reaction disk 16, with the force to propel it forwardly (or a jumping value indicated in the output area "A" of FIG. 9). If a force less than $F_1$ is applied to the input shaft 10, a force pushing the output shaft 14 forwardly is not created. The application of force less than $F_1$ to the input shaft 10 cannot compress the springs 22 and 40 to move the input shaft 10 and the plunger 11 forwardly to open the air valve 19.

Application of a force between $F_1$ and $F_3$ (see FIG. 9) to the input shaft 10 to open the air valve 19 causes the above pressure difference to be generated, thereby creating a force for propelling the valve body 7 forwardly. The valve body propelling force is transmitted to the output shaft 14 through the reaction disk 16. The value of the output force for pushing the output shaft 14 is then that of the input force for pushing the input shaft 10 multiplied by a force-boosting ratio of the booster apparatus. For example, the value Fo of the output force for pushing the output shaft 14 becomes the same value as that shown in the output area B of FIG. 9. The force-boosting ratio is determined by a ratio between the contact area of the reaction disk 16 (or the base portion 15 of the output shaft 14) with the valve body 7 and the plunger 11 and the contact area of the plunger 11 with the reaction disk 16. As mentioned above, in response to the transmission of the input shaft-pushing force to the output shaft 14, the reaction from the output shaft 14 is transmitted to the brake pedal through the input shaft 10, thereby enabling a driver to receive a sense of the reaction via the brake pedal when pushing the brake pedal.

If a force of $F_3$ is applied to the input shaft 10, the pressure in the variable pressure chamber 5 becomes identical to the atmospheric pressure so that the pressure difference between the chambers 4 and 5 is maximized. Thus, a force above $F_3$ from the input shaft 10 is transmitted to the output shaft 14 by the plunger 11 being pressed against the reaction disk 16.

In the booster apparatus of a vacuum type, the introduction of the atmospheric pressure to the variable pressure chamber 5 causes the pressure difference between the constant pressure chamber 4 and the variable pressure chamber 5. The force of the pressure difference moves the power piston 2 forwardly, and thereby the output shaft 14 generates a boosted thrusting force.

It is necessary for a booster apparatus of a vacuum type to be able to generate a strong force in a case of an emergency. In order to do this, it is necessary to increase the jumping valve as shown in the output area A of FIG. 9 or the force-boosting ratio. In the conventional booster apparatus of a vacuum type, since the force-boosting ratio is constant, increasing the jumping valve or force-boosting ratio causes an excessive braking force to be applied even if the brake pedal is pressed down lightly, causing the brakes to be slammed on. In order to avoid this happening, it is necessary for a driver to operate the brake pedal carefully, even in normal driving conditions, resulting in a driver feeling uncomfortable, and ill at ease.

SUMMARY OF THE INVENTION

An object of the present invention is to provide a booster apparatus of a vacuum type which can prevent excessive braking force from being applied in normal driving circumstances, but provides adequate braking force in the case of emergencies.

The present invention provides a booster apparatus of a vacuum type for a brake device comprising: a housing including therein a chamber; a diaphragm for dividing the chamber of the housing into a constant pressure chamber and a variable pressure chamber; an input shaft including a distal end; an output shaft including a proximal end; a plunger being engageable with the distal end of the input shaft for transmitting force from the input shaft to the output shaft; a reaction disk disposed between the plunger and the proximal end of the output shaft for transmitting reaction from the output shaft to the plunger; and a valve body mounted on the diaphragm, which valve body includes a hole for slidably receiving the plunger, a recess for fixedly receiving the reaction disk and the proximal end of the output shaft which recess is larger than the plunger hole in inner diameter, and an intermediate hole portion provided between the plunger hole and the recess which intermediate hole portion is smaller than the recess and is larger than the plunger hole in inner diameter.

The invention also provides a booster apparatus of a vacuum type for boosting and transmitting braking force applied by driver comprising: means for transmitting the braking force; means for generating boosting force to boost the braking force by using vacuum; means for applying the boosting force to the braking force; the braking force transmitting means including an input shaft, a plunger engageable with the input shaft, a reaction disk adjacent to the plunger, and an output shaft having a proximal end connected to the reaction disk for common movement of the output shaft with the reaction disk; and the boosting force applying means including a valve body to be pressed against the reaction disk for applying the boosting force to the braking force, which valve body has a hole for slidably receiving the plunger, a recess for fixedly receiving the reaction disk and the proximal end of the output shaft,.and an intermediate hole portion provided between the plunger hole and the recess, which intermediate hole portion has a side wall close to the hole and an internal wall extending from the side wall to the recess, which intermediate hole portion is of a size so that a space surrounded by the side wall, the internal wall, a portion of the plunger and a portion of the reaction disk is created when the valve body is pressed against the reaction disk by a relatively weak force, and that a portion of the reaction disk is stretched into the space and is brought into abutting engagement with the side wall when the valve body is pressed against the reaction disk by a relatively strong force.

According to the invention, the application of a relatively weak force to the input shaft to push the output shaft via the valve body and the reaction disk causes the valve body to be relatively lightly pressed against the reaction disk, thereby deforming it to a certain degree. Therefore, the force of the input shaft and the reaction transmitted by the reaction disk does not act on a portion of the reaction disk facing the intermediate hole portion, thereby decreasing a force-boosting ratio by the area of the portion of the reaction disk and decreasing an output force from the output shaft.

The application of a relatively strong force to the input shaft causes the valve body to be relatively firmly pressed against the reaction disk to deform it to a considerable degree. This causes the portion of the reaction disk facing the intermediate hole portion to be stretched into the intermediate hole portion and the stretched portion to be brought into abutting engagement with the side wall of the hole portion. The abutting engagement of the stretched portion with the side wall increases the contact area of the reaction disk with the valve body and the plunger to increase the force-boosting ratio.

DETAILED DESCRIPTION OF THE PREFERRED EMBODIMENTS

Figure 8:
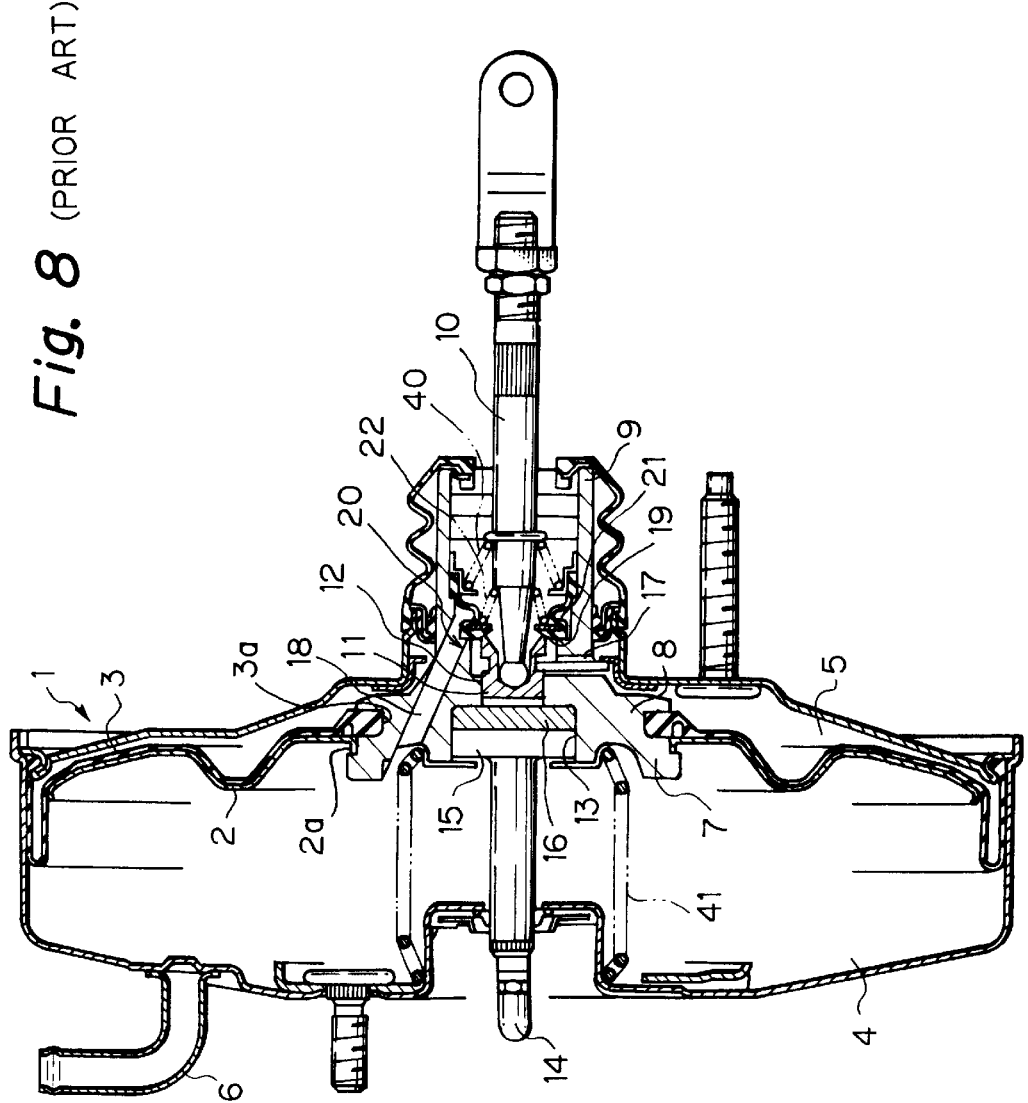
FIG. 8 is a cross sectional view showing a conventional booster apparatus of a vacuum type.
Figure 9:
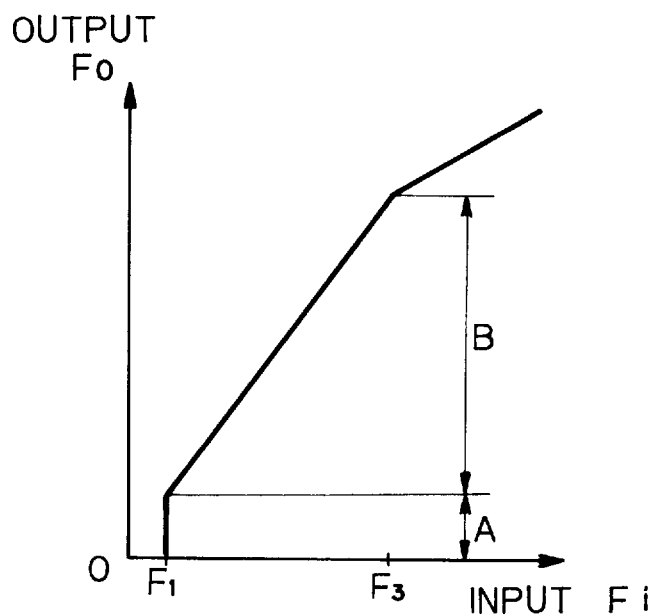
FIG. 9 is a graph showing the relation between an input to and an output from the conventional booster apparatus of a vacuum type.

A booster apparatus of a vacuum type according to a preferred embodiment of the present invention will be explained with reference to FIGS. 1–4. Elements which are common to those shown in FIG. 8 are given the same reference numerals and explanation for each of the common elements is appropriately omitted.

As shown in the drawings, the valve body 7 includes therein an intermediate hole portion 30 between the recess 13 and the plunger supporting slide hole portion 12. As to the inner diameter, the intermediate hole portion 30 is smaller than the recess 13 and is larger than the slide hole portion 12. The slide hole portion 12, the intermediate hole portion 30, and the recess 13 are continuously provided in the valve body 7. The intermediate hole portion 30 includes a side portion adjacent to the slide hole portion 12. The side portion of the hole portion 30 is formed with a circular side wall 31a which is perpendicular to the axis of the input shaft 10. The side wall 31a faces the reaction disk 16. The intermediate hole portion 30 also includes a forward portion or a cylindrical internal wall 31b arranged forwardly of the side wall 31a. The internal wall 31b of the hole portion 30 is formed so as to be parallel to the axis of the input shaft 10. The internal wall 31b extends from the side wall 31a to the recess 13.

Figure 1:
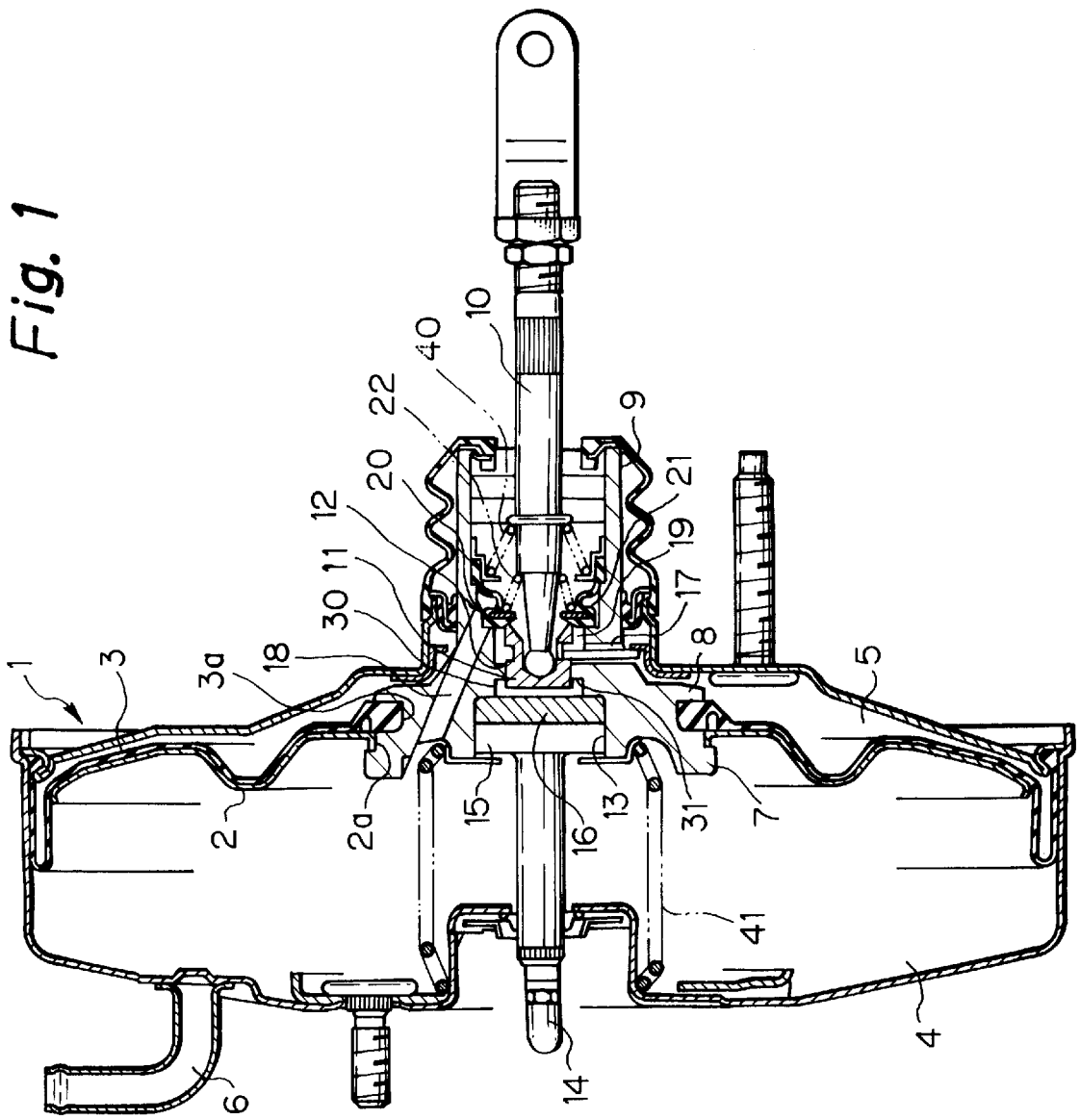
FIG. 1 is a cross sectional view showing the booster apparatus of a vacuum type according to a preferred embodiment of the present invention.
Figure 2:
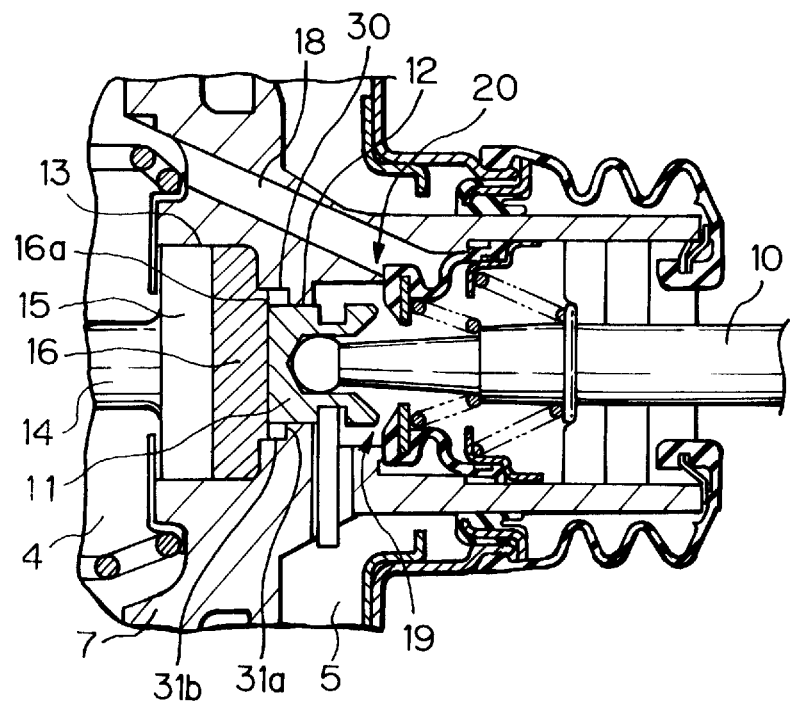
FIG. 2 is a fragmentary sectional view showing the booster apparatus of a vacuum type.

According to the booster apparatus of a vacuum type of the invention, in the initial state shown in FIG. 1, the constant pressure chamber 4 is the same in pressure (negative pressure) as the variable pressure chamber 5, and the air valve 19 and the vacuum valve 20 are in the closed position. The application of a force at or above $F_1$ to the input shaft 10 to propel it then moves the plunger 11 forwardly of the valve member 21, thereby opening the air valve 19 with the vacuum valve 20 being in the closed position. The opening of the air valve 19 allows the air to flow into the variable pressure chamber 5 through the air passage 17, thereby causing a pressure difference between the constant pressure chamber 4 and the variable pressure chamber 5. Thus this provides the output shaft 14, through the valve body 7 and the reaction disk 16, with a force for propelling it forwardly (or the jumping value indicated in the output area "A" of FIG. 4).

When a force between $F_1$ and $F_2$ shaft 10 is applied to the input, the valve body 7 is pressed against the reaction disk 16. In the preferred embodiment, the inner diameter of the intermediate hole portion 30 is larger than the inner diameter of the slide hole portion 12 or the outer diameter of the plunger 11 and is smaller than the outer diameter of the reaction disk 16. This allows the reaction disk 16 to be provided with an annular portion 16a not abutting the valve body 7 and the plunger 11, thereby decreasing the force-boosting ratio of the booster apparatus of a vacuum type by the area of the annular portion 16a. The output shaft 14 generates, for example, output values as shown in the output area B1 of FIG. 4.

In other words, reaction through the reaction disk 16 from a master cylinder piston (not shown) applied to the valve body 7 and the plunger 11 is proportional to the cross sectional area thereof. Thus, since the reaction is not applied to the valve body 7 by the area of the portion 16a of the reaction disk 16, the plunger 11 receives the stronger reaction.

Therefore, the preferred embodiment does not have the drawback of the conventional apparatus in which an excessive braking force can be applied even if a brake pedal is lightly pressed down. Thus, the brake system is easy to operate in the preferred embodiment.

Figure 3:
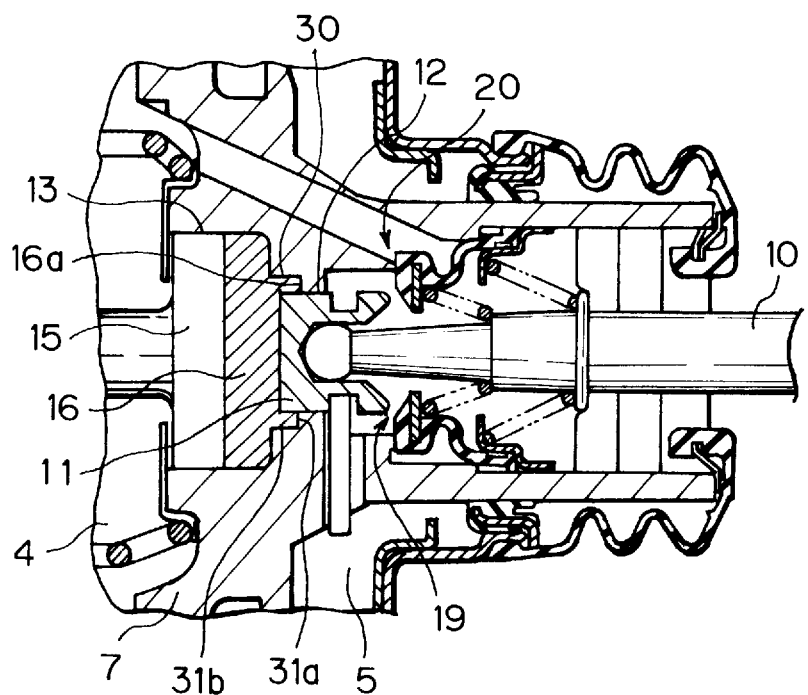
FIG. 3 is a fragmentary sectional view showing the operation of the booster apparatus of a vacuum type.
Figure 4:
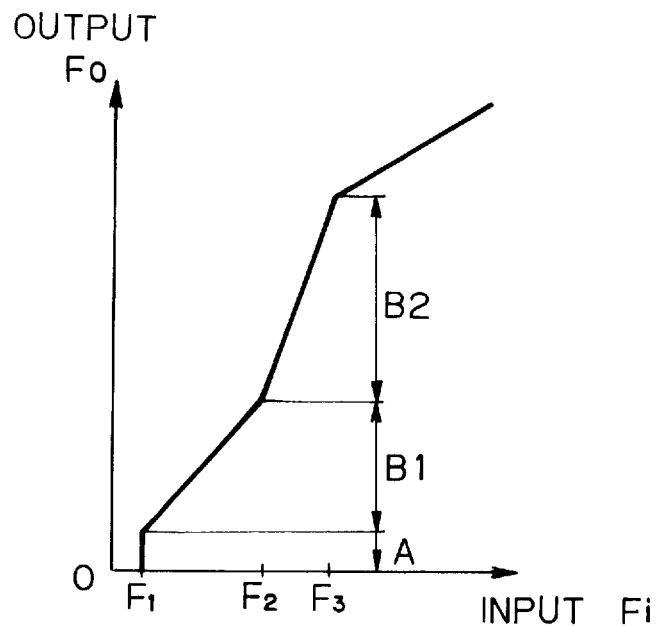
FIG. 4 is a graph showing the relation between an input to and an output from the booster apparatus of a vacuum type.

As mentioned above, the inner diameter of the intermediate hole portion 30 is larger than the inner diameter of the slide hole portion 12 or the outer diameter of the plunger 11 and is smaller than the outer diameter of the reaction disk 16. When a force above $F_2$ is applied to the input shaft 10, the valve body 7 is more strongly pressed against the reaction disk 16, thereby pushing the annular portion 16a of the reaction disk 16 into the intermediate hole portion 30. The pushed portion is brought into abutting engagement with the side wall 31a as shown in FIG. 3. The abutting engagement of the pushed portion with the side wall 31a allows the contact area of the reaction disk 16 with the valve body 7 and the plunger 11 (or the area in which the reaction disk 16 comes in contact with the valve body 7 and the plunger 11) to be increased, thereby increasing the force-boosting ratio of the booster apparatus of a vacuum type (or increasing the oblique angle of the line showing the output values in the output area $B_2$ of FIG. 4). The contact area of the reaction disk 16 with the valve body 7 and the plunger 11 determines the force-boosting ratio of the booster apparatus of a vacuum type.

In other words, since the valve body 7 receives the reaction through the area of the portion 16a of the reaction disk 16, the reaction applied to the plunger 11 can be decreased by the area of the portion 16a.

Increasing the force-boosting ratio enables the booster apparatus of a vacuum type to generate a stronger braking force by pressing down a brake pedal by a predetermined amount in the case of emergencies.

Providing the side portion of the intermediate hole portion 30 adjacent to the slide hole portion 12 with the side wall 31a perpendicular to the axis of the input shaft 10 can sufficiently increase the force-boosting ratio. Thus, a brake pedal can be easily operated, and a stronger but not excessive braking force can be applied in emergencies.

Figure 5:
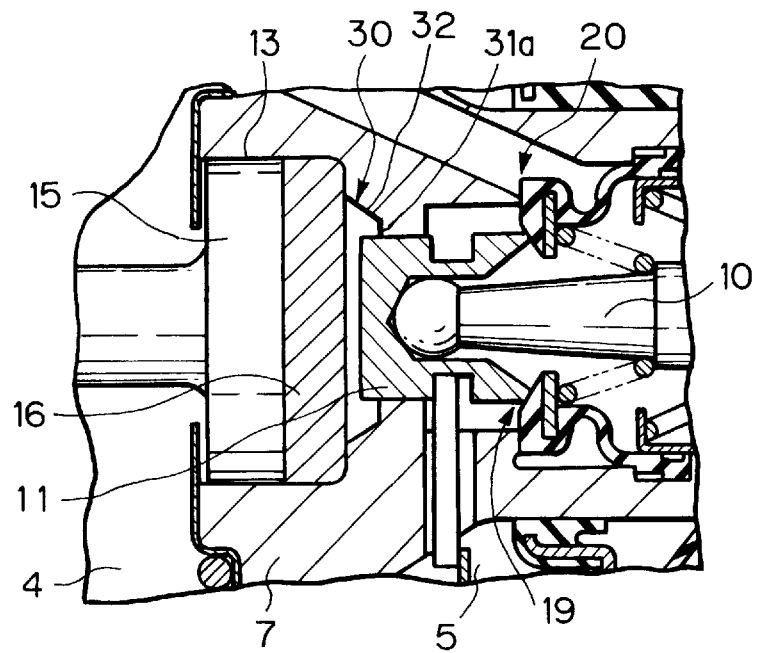
FIG. 5 is a cross sectional view showing another embodiment of an intermediate hole portion including a forward portion or a cylindrical internal wall arranged forwardly of the side wall of the intermediate hole portion which forward portion is formed with a tapered portion.
Figure 6:
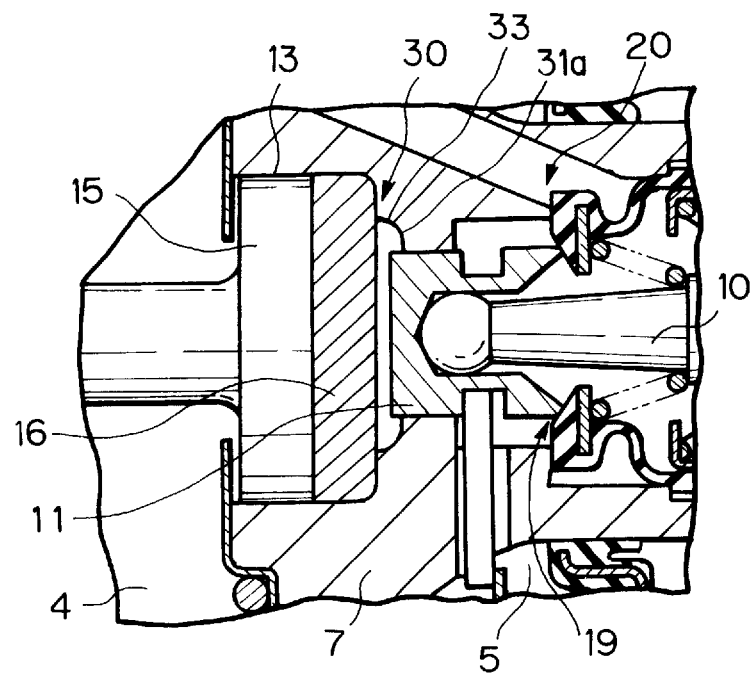
FIG. 6 is a cross sectional view showing another embodiment of an intermediate hole portion including a forward portion or a cylindrical internal wall arranged forwardly of the side wall of the intermediate hole portion which forward portion is formed with a concavity.
Figure 7:
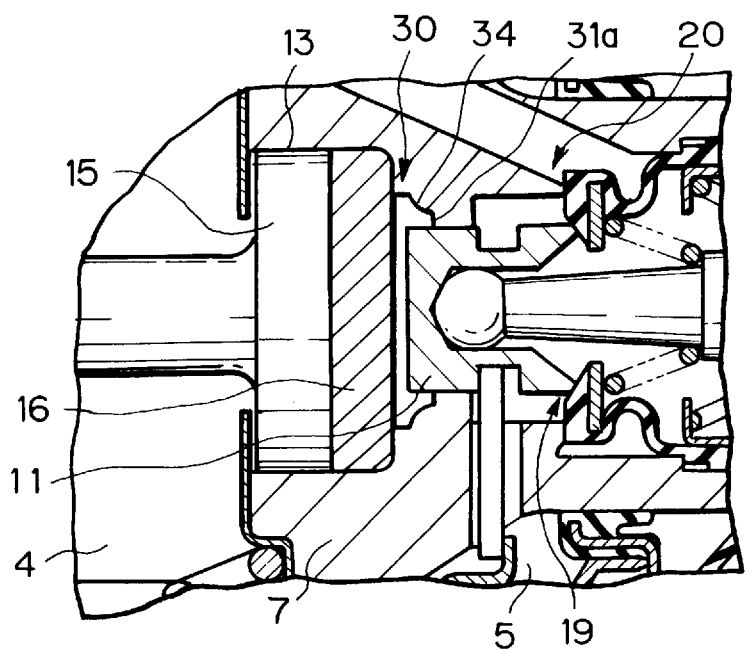
FIG. 7 is a cross sectional view showing another embodiment of an intermediate hole portion including a forward portion or a cylindrical internal wall arranged forwardly of the side wall of the intermediate hole portion which forward portion is partly formed with a convexity.

In the above embodiment, the forward portion or the internal wall of the intermediate hole portion 30 arranged forwardly of the side wall 31a of the hole portion 30 is formed so as to be parallel to the axis of the input shaft 10. As shown in FIG. 5, however, the forward portion or the internal wall 31b of the intermediate hole portion 30 arranged forwardly of the side wall 31a may be provided with a tapered portion 32 inclined relative to the axis of the input shaft 10. As shown in FIG. 6, the intermediate hole portion 30 may be partly provided with a concavity 33. As shown in FIG. 7, the hole portion 30 may be partly provided with a convexity 34.

According to the present invention, when the input shaft pushes the output shaft via the valve body and the reaction disk by a relatively small force, the reaction transmitted by the reaction disk is not exerted on a portion of the reaction disk facing the intermediate hole portion, thereby decreasing the force-boosting ratio by the area of the portion of the reaction disk and decreasing output force from the output shaft. Thus, the present invention can solve the drawback of the conventional apparatus in which too strong a braking force is generated even when a brake pedal is relatively lightly pressed down, and bring about the technical advantage in which the brake pedal is easily operated.

When the input shaft pushes the output shaft via the valve body and the reaction disk by a relatively strong force, the valve body is relatively strongly pressed against the reaction disk, thereby the portion of the reaction disk is stretched or pushed into the intermediate hole portion and brought into abutting engagement with the side wall of the intermediate hole portion. The abutting engagement of the pushed portion with the side wall increases the contact area of the reaction disk with the valve body and the plunger, and increases the force-boosting ratio. Thus, increasing the force-boosting ratio enables the booster apparatus of a vacuum type to generate stronger braking force by pressing down a brake pedal by a predetermined amount in case of emergency.

Providing the side portion of the intermediate hole portion adjacent to the slide hole portion with the side wall perpendicular to the axis of the input shaft can sufficiently increase the force-boosting ratio. Thus, a brake pedal can be easy to operate and a stronger braking force can be sufficiently generated in case of emergency.

What is claimed is:

1. A vacuum booster apparatus for a brake device, comprising:

a housing having a chamber therein;

a diaphragm in said housing separating said chamber into a constant pressure chamber and a variable pressure chamber;

an input shaft having a distal end;

an output shaft having a proximal end;

a plunger engageable with said distal end of said input shaft for transmitting a reaction force from said output shaft to said input shaft;

a reaction disk having a circumferential surface, said reaction disk disposed between said plunger and the proximal end of said output shaft for transmitting a reaction from said output shaft to said plunger;

a valve body mounted on said diaphragm, said valve body including a plunger hole slidably receiving said plunger and a hole portion adjacent to said plunger hole, said hole portion having an inner diameter larger than the inner diameter of said plunger hole;

means for defining a recess receiving the circumferential surface of said reaction disk to resist the radial expansion of said reaction disk, said recess having an inner diameter larger than the inner diameter of said hole portion;

wherein said hole portion is defined by a side wall adjacent to said plunger hole and an internal wall extending from said side wall to said recess, wherein said reaction disk has a portion thereof that is exposed to said hole portion, wherein said exposed portion of said reaction disk includes a first portion that faces said plunger and a second portion that faces said side wall of said hole portion, wherein said reaction disk has a first state in which when said reaction disk is pressed against said valve body by a relatively weak force by said output shaft, said first portion of said exposed portion engages said plunger and said second portion of said exposed portion is spaced from said side wall of said hole portion, and wherein said reaction disk has a second state in which when said reaction disk is pressed against said valve body by a relatively strong force by said output shaft, said first portion of said exposed portion engages said plunger and said second portion of said exposed portion is deformed into engagement with said side wall of said intermediate hole portion.

2. The booster apparatus according to claim 1, wherein said recess defining means is located in said valve body.

3. The booster apparatus according to claim 1, wherein said side wall extends in a direction perpendicular to the axis of said input shaft.

4. A vacuum booster apparatus for a brake device, comprising:

a housing having a chamber therein;

a diaphragm in said housing separating said chamber into a constant pressure chamber and a variable pressure chamber;

an input shaft having a distal end;

an output shaft having a proximal end;

a plunger engageable with said distal end of said input shaft for transmitting a reaction force from said output shaft to said input shaft;

a reaction disk disposed between said plunger and the proximal end of said output shaft for transmitting a reaction from said output shaft to said plunger, said reaction disk having one side end surface formed on the output shaft side thereof and an opposite side end surface formed on the plunger side thereof, the one side end surface being wholly contacted with said output shaft;

means for receiving said reaction disk to resist the radial deformation of said reaction disk and allowing the axial deformation of said reaction disk; and a valve body mounted on said diaphragm, said valve body including a plunger hole slidably receiving said plunger and a hole portion adjacent to said plunger hole, said hole portion having an inner diameter which is larger than the inner diameter of said plunger hole and is smaller than an inner diameter of said receiving means;

wherein said hole portion is defined by a side wall adjacent to said plunger hole and extending in a direction perpendicular to the axis of said plunger hole and an internal wall extending from said side wall toward the opposite side end surface of said reaction disk, wherein the opposite side end surface of said reaction disk has a portion that is exposed to said hole portion, wherein said exposed portion of said reaction disk includes a central portion that faces said plunger and an annular portion that faces said side wall of said hole portion, wherein said reaction disk has a first state in which when said reaction disk is pressed against said valve body by a relatively weak force by said output shaft, said central portion of said exposed portion engages said plunger and said annular portion of said exposed portion is spaced from said side wall of said hole portion, and wherein said reaction disk has a second state in which when said reaction disk is pressed against said valve body by a relatively strong force by said output shaft, said central portion of said exposed portion engages said plunger and said annular portion of said exposed portion is deformed into engagement with said side wall of said intermediate hole portion.

5. The booster apparatus according to claim 4, wherein said receiving means is provided in said valve body.

6. The booster apparatus according to claim 4, wherein said side wall extends in a direction perpendicular to the axis of said input shaft.

7. A vacuum booster apparatus for a brake device, comprising:

a housing having a chamber therein;

a diaphragm in said housing separating said chamber into a constant pressure chamber and a variable pressure chamber;

an input shaft having a distal end;

an output shaft having a proximal end;

a plunger engageable with said distal end of said input shaft for transmitting a reaction force from said output shaft to said input shaft;

a reaction disk disposed between said plunger and the proximal end of said output shaft for transmitting a reaction from said output shaft to said plunger; and a valve body mounted on said diaphragm having a plunger hole slidably receiving said plunger, a recess receiving said reaction disk and the proximal end of said output shaft, said recess having an inner diameter larger than the inner diameter of said plunger hole, and an intermediate hole portion between said plunger hole and said recess, said intermediate hole portion having an inner diameter that is smaller than the inner diameter of said recess and larger than the inner diameter of said plunger hole, wherein said intermediate hole portion is defined by a side wall adjacent to said plunger hole and an internal wall extending from said side wall to said recess, wherein said reaction disk has a portion thereof that is exposed to said intermediate hole portion, wherein said exposed portion of said reaction disk includes a first portion that faces said plunger and a second portion that faces said side wall of said intermediate hole portion, wherein said reaction disk has a first state in which when said reaction disk is pressed against said valve body by a relatively weak force by said output shaft, said first portion of said exposed portion engages said plunger and said second portion of said exposed portion is spaced from said side wall of said intermediate hole portion, and wherein said reaction disk has a second state in which when said reaction disk is pressed against said valve body by a relatively strong force by said output shaft, said first portion of said exposed portion engages said plunger and said second portion of said exposed portion is deformed into engagement with said side wall of said intermediate hole portion.

8. The booster apparatus according to claim 7, wherein said side wall extends in a direction perpendicular to the axis of said input shaft.

9. The booster apparatus according to claim 8, wherein said internal wall comprises a tapered portion inclined relative to the axis of the input shaft.

10. The booster apparatus according to claim 8, wherein said internal wall and said side wall partly comprise a concavity.

11. The booster apparatus according to claim 8, wherein said internal wall and said side wall partly comprise a convexity.

12. The booster apparatus according to claim 7, wherein said internal wall extends in a direction parallel to the axis of said input shaft.

13. The booster apparatus according to claim 12, wherein a concavity is provided between said side wall and said internal wall.

14. The booster apparatus according to claim 12, wherein a convexity is provided between said side wall and said internal wall.

15. A vacuum booster apparatus for boosting and transmitting a braking force, comprising:

a brake force transmitting means for transmitting a braking force;

a boosting force generating means for generating a boosting force to boost the braking force with a vacuum;

force applying means for applying the boosting force to the braking force;

wherein said brake force transmitting means comprises an input shaft, a plunger engageable with said input shaft, a reaction disk adjacent to said plunger, and an output shaft having a proximal end connected to said reaction disk for common movement of said output shaft with said reaction disk;

wherein said boosting applying means comprises a valve body adapted to be pressed against said reaction disk for applying the boosting force to the braking force, said valve body having a plunger hole slidably receiving said plunger, a recess receiving said reaction disk and the proximal end of said output shaft, and an intermediate hole portion between said plunger hole and said recess, wherein said intermediate hole portion has a side wall adjacent to said plunger hole and an internal wall extending from said side wall to said recess, wherein said reaction disk has a portion thereof that is exposed to said intermediate hole portion, wherein said exposed portion of said reaction disk includes a first portion that faces said plunger and a second portion that faces said side wall of said intermediate hole portion, wherein said reaction disk has a first state in which when said reaction disk is pressed against said valve body by a relatively weak force by said output shaft, said first portion of said exposed portion engages said plunger and said second portion of said exposed portion is spaced from said side wall of said intermediate hole portion, and wherein said reaction disk has a second state in which when said reaction disk is pressed against said valve body by a relatively strong force by said output shaft, said first portion of said exposed portion engages said plunger and said second portion of said exposed portion is deformed beyond an abutting engagement point of said first portion and said plunger into engagement with said side wall of said intermediate hole portion.

16. A vacuum booster apparatus for a brake device, comprising:

a housing having a chamber therein;

a diaphragm dividing the chamber of said housing into a constant pressure chamber and a variable pressure chamber;

an input shaft having a distal end;

an output shaft having a proximal end;

a plunger engageable with the distal end of said input shaft for transmitting a reaction from said output shaft to said input shaft;

a reaction disk disposed between said plunger and the proximal end of said output shaft for transmitting a reaction from said output shaft to said plunger; and a valve body mounted on said diaphragm, said valve body having a hole slidably receiving said plunger, a recess receiving said reaction disk and the proximal end of said output shaft, said recess being larger than said plunger hole in inner diameter, and an intermediate hole portion between said plunger hole and said recess, said intermediate hole portion being smaller than said recess and larger than said plunger hole in inner diameter, said intermediate hole portion including a side wall extending in a direction perpendicular to the axis of said input shaft and an internal wall extending from said side wall to said recess, and said internal wall comprising a tapered portion inclined relative to the axis of the input shaft.

17. A vacuum booster apparatus for a brake device, comprising:

a housing having a chamber therein;

a diaphragm dividing the chamber of said housing into a constant pressure chamber and a variable pressure chamber;

an input shaft having a distal end;

an output shaft having a proximal end;

a plunger engageable with the distal end of said input shaft for transmitting a reaction from said output shaft to said input shaft;

a reaction disk disposed between said plunger and the proximal end of said output shaft for transmitting a reaction from said output shaft to said plunger; and a valve body mounted on said diaphragm, said valve body having a hole slidably receiving said plunger, a recess receiving said reaction disk and the proximal end of said output shaft, said recess being larger than said plunger hole in inner diameter, and an intermediate hole portion between said plunger hole and said recess, said intermediate hole portion being smaller than said recess and larger than said plunger hole in inner diameter, said intermediate hole portion including a side wall extending in a direction perpendicular to the axis of said input shaft and an internal wall extending from said side wall to said recess, and said internal wall and said side wall partly comprising a convexity.

18. A vacuum booster apparatus for a brake device, comprising:

a housing having a chamber therein;

a diaphragm dividing the chamber of said housing into a constant pressure chamber and a variable pressure chamber;

an input shaft having a distal end;

an output shaft having a proximal end;

a plunger engageable with the distal end of said input shaft for transmitting a reaction from said output shaft to said input shaft;

a reaction disk disposed between said plunger and the proximal end of said output shaft for transmitting a reaction from said output shaft to said plunger; and a valve body mounted on said diaphragm, said valve body having a hole slidably receiving said plunger, a recess receiving said reaction disk and the proximal end of said output shaft, whice recess is larger than said plunger hole inner diameter, and an intermediate hole portion between said plunger hole and said recess, said intermediate hole portion being smaller than said recess and larger than said plunger hole in inner diameter, said intermediate hole portion including a side wall extending in a direction perpendicular to the axis of said input shaft and an internal wall extending from said side wall to said recess, said internal wall being parallel to the axis of said input shaft, and a convexity provided between said side wall and said internal wall.

19. A vacuum booster apparatus for boosting and transmitting a braking force applied by an operator, comprising:

means for transmitting a braking force;

means for generating a boosting force to boost the braking force with a vacuum; and means for applying the boosting force to the braking force;

said boosting force applying means including means for controlling a boosting ratio of application of the boosting force to the braking force so that the boosting ratio when the operator applies a relatively strong braking force is larger than that when the operator applies a relatively weak braking force.

20. A booster apparatus for a brake device, comprising:

a housing having a chamber therein;

a diaphragm in said housing separating said chamber into a constant pressure chamber and a variable pressure chamber;

an input shaft having a distal end;

an output shaft having a proximal end;

a plunger engageable with said distal end of said input shaft for transmitting a reaction force from said output shaft to said input shaft;

a reaction disk disposed between said plunger and the proximal end of said output shaft for transmitting a reaction from said output shaft to said plunger, said reaction disk having one side end surface formed on the output shaft side thereof and an opposite side end surface formed on the plunger side thereof, the one side end surface being contacted with said output shaft;

a receiving device having an inner diameter which is substantially the same as a diameter of said reaction disk to receive said reaction disk; and a valve body mounted on said diaphragm, said valve body including a plunger hole slidably receiving said plunger and a hole portion adjacent to said plunger hole, said hole portion having an inner diameter which is larger than the inner diameter of said plunger hole and is smaller than the inner diameter of said receiving device;

wherein said hole portion is defined by a side wall adjacent to said plunger hole and extending in a direction perpendicular to the axis of said plunger hole and an internal wall extending from said side wall toward the opposite side end surface of said reaction disk, wherein the opposite side end surface of said reaction disk has a portion that is exposed to said hole portion, wherein said exposed portion of said reaction disk includes a central portion that faces said plunger and an annular portion that faces said side wall of said hole portion, wherein said reaction disk has a first state in which when said reaction disk is pressed against said valve body by a relatively weak force by said output shaft, said central portion of said exposed portion engages said plunger and said annular portion of said exposed portion is spaced from said side wall of said hole portion, and wherein said reaction disk has a second state in which when said reaction disk is pressed against said valve body by a relatively strong force by said output shaft, said central portion of said exposed portion engages said plunger and said annular portion of said exposed portion is deformed into engagement with said side wall of said hole portion.

21. The booster apparatus according to claim 20, wherein said receiving device is provided in said valve body.

22. The booster apparatus according to claim 20, wherein said side wall extends in a direction perpendicular to the axis of said input shaft.

23. A booster apparatus for a brake device, comprising:

a housing having a chamber therein;

a diaphragm in said housing separating said chamber into a constant pressure chamber and a variable pressure chamber;

an input shaft having a distal end;

an output shaft having a proximal end;

a plunger engageable with said distal end of said input shaft for transmitting a reaction force from said output shaft to said input shaft;

a reaction disk disposed between said plunger and the proximal end of said output shaft for transmitting a reaction from said output shaft to said plunger;

a valve body mounted on said diaphragm having a plunger hole slidably receiving said plunger;

a recess portion receiving said reaction disk and being associated with the proximal end of said output shaft, said recess portion having an inner diameter larger than the inner diameter of said plunger hole; and an intermediate hole portion between said plunger hole and said recess portion, said intermediate hole portion having an inner diameter that is smaller than the inner diameter of said recess portion and larger than the inner diameter of said plunger hole, wherein said intermediate hole portion is defined by a side wall adjacent to said plunger hole and an internal wall extending from said side wall to said recess portion, wherein said reaction disk has a portion thereof that is exposed to said intermediate hole portion, wherein said exposed portion of said reaction disk includes a first portion that faces said plunger and a second portion that faces said side wall of said intermediate hole portion, wherein said reaction disk has a first state in which when said reaction disk is pressed against said valve body by a relatively weak force by said output shaft, said first portion of said exposed portion engages said plunger and said second portion of said exposed portion is spaced from said side wall of said intermediate hole portion, and wherein said reaction disk has a second state in which when said reaction disk is pressed against said valve body by a relatively strong force by said output shaft, said first portion of said exposed portion engages said plunger and said second portion of said exposed portion is deformed into engagement with said side wall of said intermediate hole portion.

24. The booster apparatus according to claim 23, wherein said recess portion and said intermediate hole portion are provided in said valve body.

25. The booster apparatus according to claim 23, wherein said side wall extends in a direction perpendicular to the axis of said input shaft.

26. A booster apparatus for boosting and transmitting a braking force, comprising:

a brake force transmitting means for transmitting a braking force;

a boosting force generating means for generating a boosting force to boost the braking force with a vacuum;

force applying means for applying the boosting force to the braking force;

wherein said brake force transmitting means comprises an input shaft, a plunger engageable with said input shaft, a reaction disk adjacent to said plunger, and an output shaft having a proximal end connected to said reaction disk for common movement of said output shaft with said reaction disk;

wherein said boosting applying means comprises:

a valve body adapted to be pressed against said reaction disk for applying the boosting force to the braking force, said valve body having a plunger hole slidably receiving said plunger;

a recess portion receiving said reaction disk and being associated with the proximal end of said output shaft, said recess portion having an inner diameter larger than the inner diameter of said plunger hole; and an intermediate hole portion between said plunger hole and said recess portion, wherein said intermediate hole portion has a side wall adjacent to said plunger hole and an internal wall extending from said side wall to said recess portion, wherein said reaction disk has a portion thereof that is exposed to said intermediate hole portion, wherein said exposed portion of said reaction disk includes a first portion that faces said plunger and a second portion that faces said side wall of said intermediate hole portion, wherein said reaction disk has a first state in which when said reaction disk is pressed against said valve body by a relatively weak force by said output shaft, said first portion of said exposed portion engages said plunger and said second portion of said exposed portion is spaced from said side wall of said intermediate hole portion, and wherein said reaction disk has a second state in which when said reaction disk is pressed against said valve body by a relatively strong force by said output shaft, said first portion of said exposed portion engages said plunger and said second portion of said exposed portion is deformed beyond an abutting engagement point of said first portion and said plunger into engagement with said side wall of said intermediate hole portion.

27. The booster apparatus according to claim 26, wherein said recess portion and said intermediate hole portion are provided in said valve body.

28. The booster apparatus according to claim 26, wherein said side wall extends in a direction perpendicular to the axis of said input shaft.

29. A booster apparatus for a brake device, comprising:

a housing having a chamber therein;

a diaphragm in said housing separating said chamber into a constant pressure chamber and a variable pressure chamber;

an input shaft having a distal end;

an output shaft having a proximal end;

a plunger engageable with said distal end of said input shaft for transmitting a reaction force from said output shaft to said input shaft;

a reaction disk having a circumferential surface, said reaction disk disposed between said plunger and the proximal end of said output shaft for transmitting a reaction from said output shaft to said plunger;

a valve body mounted on said diaphragm, said valve body including a plunger hole slidably receiving said plunger and a hole portion adjacent to said plunger hole, said hole portion having an inner diameter larger than the inner diameter of said plunger hole;

a structural portion comprising a recess receiving the circumferential surface of said reaction disk to resist the radial expansion of said reaction disk, said recess having an inner diameter larger than the inner diameter of said hole portion;

wherein said hole portion is defined by a side wall adjacent to said plunger hole and an internal wall extending from said side wall to said recess, wherein said reaction disk has a portion thereof that is exposed to said hole portion, wherein said exposed portion of said reaction disk includes a first portion that faces said plunger and a second portion that faces said side wall of said hole portion, wherein said reaction disk has a first state in which when said reaction disk is pressed against said valve body by a relatively weak force by said output shaft, said first portion of said exposed portion engages said plunger and said second portion of said exposed portion is spaced from said side wall of said hole portion, and wherein said reaction disk has a second state in which when said reaction disk is pressed against said valve body by a relatively strong force by said output shaft, said first portion of said exposed portion engages said plunger and said second portion of said exposed portion is deformed into engagement with said side wall of said intermediate hole portion.

30. The booster apparatus according to claim 29, wherein said structural portion is located in said valve body.

31. The booster apparatus according to claim 29, wherein said side wall extends in a direction perpendicular to the axis of said input shaft.

32. A booster apparatus for a brake device, comprising:

a housing having a chamber therein;

a diaphragm in said housing separating said chamber into a constant pressure chamber and a variable pressure chamber;

an input shaft having a distal end;

an output shaft having a proximal end;

a plunger engageable with said distal end of said input shaft for transmitting a reaction force from said output shaft to said input shaft;

a reaction disk supported between said plunger and the proximal end of said output shaft for transmitting a reaction from said output shaft to said plunger, said reaction disk having one side end surface formed on the output shaft side thereof and an opposite side end surface formed on the plunger side thereof, the one side end surface being contacted with said output shaft; and a valve body mounted on said diaphragm, said valve body including a plunger hole slidably receiving said plunger and a hole portion adjacent to said plunger hole, said hole portion having an inner diameter which is larger than the inner diameter of said plunger hole;

wherein said hole portion is defined by a side wall adjacent to said plunger hole and extending in a direction perpendicular to the axis of said plunger hole and an internal wall extending from said side wall toward the opposite side end surface of said reaction disk, wherein said reaction disk is disposed between said hole portion and the proximal end of said output shaft and a diameter of said reaction disk is larger than the inner diameter of said hole portion, wherein the opposite side end surface of said reaction disk has a portion that is exposed to said hole portion, wherein said exposed portion of said reaction disk includes a central portion that faces said plunger and an annular portion that faces said side wall of said hole portion, wherein said reaction disk has a first state in which when said reaction disk is pressed against said valve body by a relatively weak force by said output shaft, said central portion of said exposed portion engages said plunger and said annular portion of said exposed portion is spaced from said side wall of said hole portion, and wherein said reaction disk has a second state in which when said reaction disk is pressed against said valve body by a relatively strong force by said output shaft, said central portion of said exposed portion engages said plunger and said annular portion of said exposed portion is deformed into engagement with said side wall of said hole portion.

* * * * *